Oct. 9, 1956   F. W. SIPPACH, JR   2,766,428
CAPACITANCE MEASURING CIRCUIT
Filed Sept. 9, 1954   2 Sheets-Sheet 1
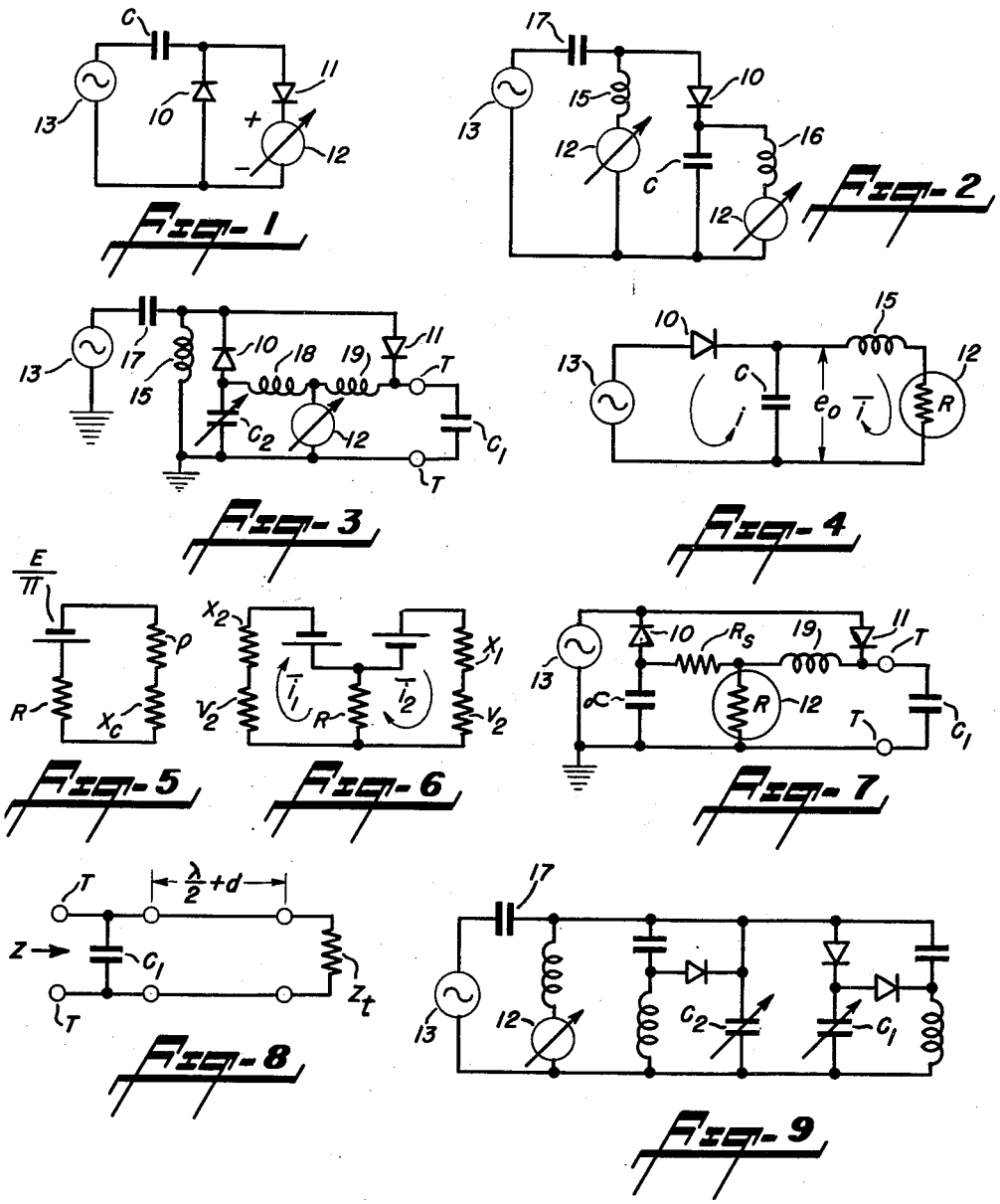
FREDERICK W. SIPPACH JR.
INVENTOR.
BY
Rudolph J. Jurick
ATTORNEY Oct. 9, 1956 F. W. SIPPACH, JR 2,766,428
CAPACITANCE MEASURING CIRCUIT
Filed Sept. 9, 1954 2 Sheets-Sheet 2

FREDERICK W. SIPPACH JR.
INVENTOR.

BY
Rudolph J. Jurick
ATTORNEY

United States Patent Office 2,766,428
Patented Oct. 9, 1956

2,766,428

CAPACITANCE MEASURING CIRCUIT

Frederich W. Sippach, Jr., Millburn, N. J., assignor to Weston Electrical Instrument Corporation, Newark, N. J., a corporation of New Jersey Application September 9, 1954, Serial No. 454,982

16 Claims. (Cl. 324—61)

This invention relates to a direct reading type of capacitance meter and more particularly to a novel capacity-sensitive circuit and indicating meter linearly responsive to changes in capacitance.

While the circuit to be described therein in detail is adapted for the direct measurement of changes in capacity, the description will be limited to the application of the circuit to a moisture meter.

Numerous methods and arrangements are known for the determination and measurement of the moisture content of substances. One general arrangement particularly suited for the measurement of the moisture content of hygroscopic substances having relatively high dielectric losses is based upon the change in capacity between two spaced plates between which the substance is placed. The changes in capacity, brought about by changes in the moisture content of the material under test, are read directly in percent moisture content from a suitably calibrated indicating instrument that is responsive to current changes in the measuring network.

The present invention is directed to the provision of a novel electrical network, including an indicating instrument or control element, which has numerous highly desirable features not found in arrangements heretofore proposed. In particular, my capacity type moisture meter affords the following advantages:

1. The measurement of the dielectric properties of wet materials in terms of capacitance is made in such a way that no large errors are introduced due to the very high power factor of wet materials;

2. The network includes a direct reading electrical meter and such meter responds to current or voltage directly proportional to capacitance;

3. The circuit operates in the megacycle region so that the capacitance to moisture relation is very nearly linear;

4. The circuit is adapted for use with long connecting cables between the indicating instrument and the condenser test cell;

5. The circuit is particularly adapted for use with a very sensitive indicating instrument with very low zero drift;

6. Convenient means are provided to balance out initial cell capacitance or other capacitance so that the meter will respond only to the change in capacitance of the material under test;

7. Simple means are provided for completely calibrating the instrument to achieve the above features at the lowest possible cost; and 8. The source of voltage and the indicating instrument can be grounded.

It, therefore, is the broad object of this invention to provide a direct reading instrument responsive to changes in capacity and affording the features and advantages set forth hereinabove.

An object of this invention is the provision of a direct reading capacity measurement arrangement comprising a low impedance source of radio frequency oscillations, a measuring network energized by said source and including means rectifying the radio frequency current, a meter responsive to the rectified current, means to connect an unknown capacitance into the network and means to balance out a selected portion of the unknown capacitance whereby the meter will respond directly to changes in unknown capacity.

These and other objects and advantages will become apparent from the following description when taken with the accompanying drawings illustrating the invention. It will be understood the drawings are for purposes of illustration and are not to be construed as defining the scope or spirit of the invention, reference for the later purpose being had to the claims appended hereto.

In the drawings wherein like reference characters denote like parts in the several views:

Figures 1 and 2 are diagrams of the basic circuit used in my capacity measuring system;

Figure 3 is an expanded circuit including an arrangement for balancing out stray capacity and the initial capacity of the cell used to hold the material under test;

Figure 4 is an equivalent of the basic circuit;

Figures 5 and 6 are, respectively, equivalent circuits corresponding to those shown in Figures 2 and 3, and energized by batteries;

Figure 7 is similar to Figure 3 but with the balancing condenser replaced by a resistance to obtain improved isolation of the diodes;

Figure 8 illustrates a two-conductor cable with a condenser connected across the input end;

Figures 9 and 10 are variations of the circuit shown in Figure 3;

Figure 10:
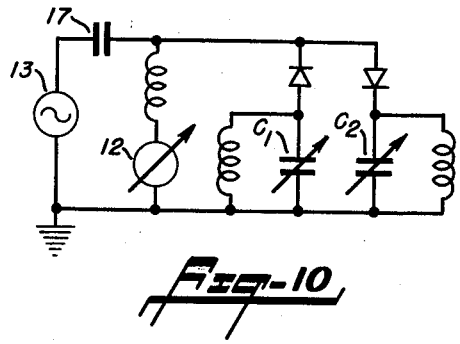
Figure 11:
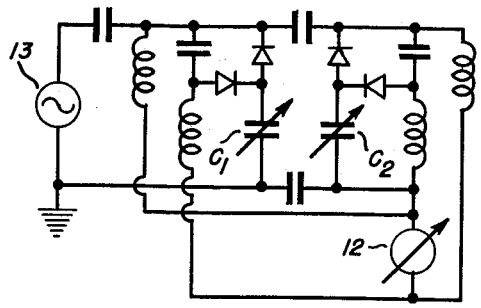
Figures 11 to 13 are further variations of the basic circuit and in which both rectifier circuits operate on the same half cycle of current, whereby the zero point of the meter is independent of wave form.
Figure 12:
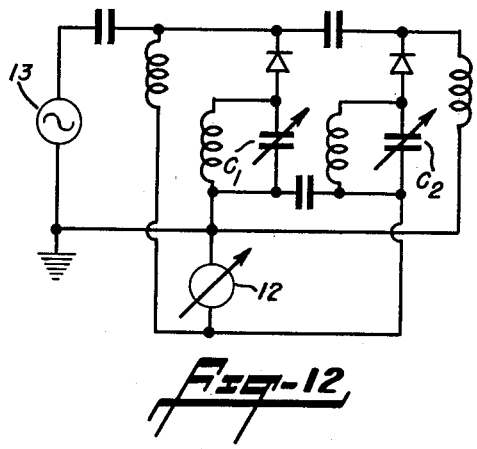
Figure 13:
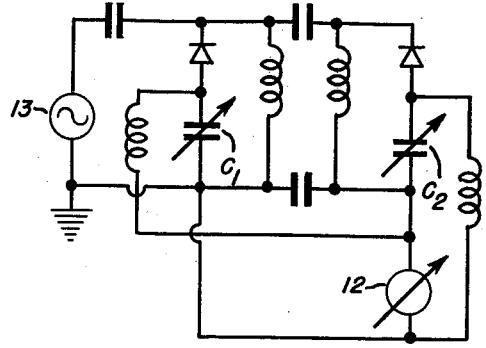

My capacity measuring circuit is based upon the rectification of a radio frequency current by germanium diodes having a low forward resistance and measuring the D. C. current by means of a conventional permanent magnet-movable coil instrument.

Figures 1 and 2 illustrate the basic circuits. In Figure 1 the network comprises a pair of germanium diodes 10, 11, a device responsive to direct current such as the direct current indicating instrument 12 and a condenser C connected to the terminals of a radio frequency generator 13. In this circuit the condenser C charges during the negative half cycle of the voltage and discharges through the meter 12 during the positive half cycle.

In the Figure 2 circuit a single diode 10 is used in conjunction with a pair of radio frequency choke coils 15, 16 and a blocking condenser 17. The meter 10 can be connected in series with either of the choke coils as shown. In this arrangement the condenser C charges through the diode and discharges through the choke coil and meter.

In either of the above cases, the generator should be capable of providing a constant voltage independent of the impedance of the condenser. The Figure 2 circuit is preferred since it uses only one diode resulting in a greater circuit sensitivity.

In a moisture meter it is desirable to provide a convenient means for balancing out the initial capacity of the cell adapted to hold the material under test as well as any other stray capacities so that the indicating meter will respond only to capacity changes due to the moisture content of the material. I accomplish this by developing a buck-out current from another rectifier as shown in the basic circuit of Figure 3. Here the meter 12 is connected between the choke coils 18, 19 having ends connected to the reversely-disposed diodes 10, 11. The test cell is represented by the capacitance $C_1$ connected to the network terminals T, T and the initial capacitance thereof is balanced by the balancing condenser $C_2$. In such arrangement not only are voltage variations of the generator cancelled out of the meter reading but changes in generator frequency and temperature changes of the diodes and choke coils do not affect the meter indications. This circuit also permits grounding of the generator, the meter and both the balancing condenser $C_2$ and one network terminal. Consequently, any stray capacitance to ground across the generator has no effect upon the reading and stray capacitance across the network terminals can be balanced out completely. Further, the zero point of the meter can be shifted in either direction and the circuit can be calibrated by placing a known capacitance across the network terminals and adjusting the meter sensitivity to give the desired reading. Since the circuit is capable of giving a linear impedance/meter current reading this operation completely calibrates the instrument. As will be explained in detail hereinbelow, the balancing and measuring diodes can be separated and placed at opposite ends of a long cable so that the test cell holding the material may be well separated from the indicating meter. Loading effects due to the high power factor of the material under test do not affect the accuracy of the system as long as the generator impedance is a sufficiently low value.

I shall now consider the design factors of the two portions of the circuit which go to make up the moisture meter.

Consideration is first given to the rectifier circuit with specific reference to the equivalent circuit shown in Figure 4.

$C$=capacitance of condenser C, to be measured, in farads;
$\rho$=forward resistance of the diode 10, in ohms;
$R$=resistance of meter 12, in ohms;
$i$=current of generator 13, in amperes;
$\bar{i}$=average rectified current, in amperes;
$e_0$=average voltage across the condenser C, in volts;
$E$=peak R. F. voltage, in volts;
$X_c$=reactance of condenser C, in ohms;
$\omega = 2\pi$ times the generator frequency, $f$; and
$t$=time in seconds.

When the voltage across the diode is positive the diode will conduct and during conduction the A.-C. forward current initially is:

$$i = \frac{E \sin \omega t}{\rho + X_c}$$

After $n$ cycles, the charge entering the condenser, per cycle, must equal the charge leaving (through the meter), per cycle. There is, then, a voltage drop across the meter (resistance R) equal to the $e_0$ and the expression for the forward current over a period of time $t$ finally becomes:

$$i = \frac{E \sin \omega t - e_0}{\rho + X_c} \text{ for } t_1 \leq t \leq \frac{t}{2} - t_1$$

$$= 0 \text{ for } t_1 > t > \frac{t}{2} - t_1$$

where $t_1$ is the time at which the diode starts to conduct or the time at which the voltage across the diode just equals zero, assuming, of course, an infinite back resistance for the voltage less than zero. Then:

$$E \sin \omega t_1 - e_0 = 0$$

or $$t_1 = \frac{1}{\omega} \sin^{-1} \frac{e_0}{E}$$

The average current is then given by the first term of the Fourrier expansion:

$$F(t) = A_0 + \sum_{n=-\alpha}^{n=+\alpha} A_n e^{-jn\omega t}$$

where $$A_0 = \frac{1}{T} \int_0^T F(t) dt$$

Then:

$$\bar{i} = \frac{1}{T} \int_0^{\frac{T}{2} - 2t} \frac{E \sin \omega t - e_0}{\rho + X_c} dt$$

$$= \frac{f}{\rho + X_c} \int_0^{\frac{1}{2v} - \frac{2}{\omega} \sin^{-1} \frac{e_0}{E}} E \sin \omega t \, dt - \frac{V}{\rho + X_c} \int_0^{\frac{1}{2v} - \frac{2}{\omega} \sin^{-1} \frac{e_0}{E}} e_0 dt$$

$$= \left(\frac{1}{\rho + X_c}\right)\left(\frac{E}{2\pi}\right)\left[\cos\left(\pi - 2\sin^{-1}\frac{e_0}{E}\right) - \cos 0\right]$$

$$- \left(\frac{e_0}{\rho + X_c}\right)\left[\frac{1}{2f} - \frac{1}{\pi f}\sin^{-1}\frac{e_0}{E}\right]$$

$$= \left(\frac{1}{\rho + X_c}\right)\left(\frac{E}{2\pi}\right)\left[\cos\left(2\sin^{-1}\frac{e_0}{E}\right) - 1\right] -$$

$$\frac{e_0}{\pi(\rho + X_c)}\left[\frac{\pi}{2} - \sin^{-1}\frac{e_0}{E}\right]$$

or:

$$\bar{i} = \frac{E}{\pi(\rho + X_c)}\left[\sqrt{1 - \frac{e_0^2}{E^2}} - \frac{e_0}{E}\left(\frac{\pi}{2} - \sin^{-1}\frac{e_0}{E}\right)\right]$$

If the meter resistance is small, then:

$$\frac{e_0}{E} \ll 1$$

or:

$$\bar{i}(\rho + X_c) \approx \frac{E}{\pi} - \frac{e_0}{2}$$

But $$\frac{e_0}{2}$$

must be equal to $\bar{i}R$ after many cycles, so that:

$$\bar{i} = \frac{2fEC}{\sqrt{1 + \omega^2 C^2 (\rho + R^2)}}$$

If the product $\omega C(\rho + R)$ is the circuit time constant. If the meter resistance and the diode forward resistance are small enough at a given frequency so that $$\omega C(\sqrt{\rho + R}) \ll 1,$$

then:

$$\bar{i} = 2fEC$$

Thus, the meter current can be made directly proportional to C over any given range of capacitance by merely choosing the proper time constant.

An equivalent D. C. circuit can be drawn because of the relationship:

$$\bar{i}(\rho + X_c) = \frac{E}{\pi} - \frac{e_0}{2} = \frac{E}{\pi} - \bar{i}R$$

If a battery is introduced for the voltage $$\frac{E}{\pi}$$

the circuit shown in Figure 5 results. If, now, we introduce the rectifier used to buck out the initial current, the equivalent circuit shown in Figure 6 is obtained.

If we let the meter current $I_m$ be equal to $\bar{i}_1 - \bar{i}_2$ and if the circuit time constants are small, then:

$$I_m = 2fE(C_1 - C_2) = 2fE\Delta C$$

Therefore, the meter current is directly proportional to the capacitance difference between $C_1$ and $C_2$. The circuit is balanced initially by making $C_2 = C_1$ so that any capacitance change at the network terminals is indicated directly by the meter.

The above expressions show that the system sensitivity is proportional to frequency and generator voltage and in the practical form of the invention the voltage-frequency product is chosen to give the best sensitivity within the current range of the diodes.

Improved D. C. isolation of the rectifier diodes may, of course, be obtained by replacing $C_2$ by a resistive element but this would destroy the ability of the circuit to balance itself against changes in the generator frequency. If the generator constitutes a stable oscillator this factor is not of major importance. Figure 7 illustrates the circuit with a resistance $R_s$ substituted for the balancing condenser $C_2$ of the Figure 3 circuit. In this case, we must make $$\frac{E}{\pi R_s} = 2fEC$$

and bypass $R_s$ by a very large capacitor. If $R_s \gg R$ then the circuit will be completely isolated and current from one rectifier cannot pass through the other. This condition would also prevail if the meter resistance is very small. However, on very sensitive instrument ranges (where the meter resistance will be fairly high) the use of the resistance $R_s$ reduces the drift due to differences in the diode resistance with temperature differences.

In a practical embodiment of the circuit (as will be described hereinbelow) any number of indicating meter ranges can be provided (over the range for which $$\omega C(\rho + R) \ll 1$$

is satisfied) by simply switching shunt resistors across the meter. Since it is desirable to keep the overall resistance as low as possible to maintain linear meter response a simple parallel shunt arrangement is preferred.

The circuit should be so designed that the balance currents are as small as possible in the interest of good stability. This means that the initial capacitance at the network terminals should be as small as possible. Actually, this particular factor becomes increasingly important with increasing frequency since the current is directly proportional to frequency. Thus, in order to satisfy the requirements of good sensitivity and good stability at high frequencies, it was found necessary to devise a means of tuning out the major portion of the initial capacity at the network terminals. In numerous applications of a moisture meter a relatively long cable is required between the network terminals and the test cell. The two requirements; namely, a long connecting cable and the tuning out of the initial capacity of the test cell can be combined neatly by resonating the cable as follows:

Consider a looseless transmission line and let:

$Z_0$ = characteristic impedance of the line, in ohms,
$Z_n$ = impedance looking into the line, in ohms,
$Z_t$ = termination impedance of the other end of the line, in ohms,
$\beta$ = propagation constant of the line =

$$\frac{\omega}{V} = \frac{2\pi}{\lambda}$$

$l$ = the length of the line in feet,
$V$ = velocity of the wave along the line =

$$\frac{1}{\sqrt{\omega E}}$$

As is well known, the impedance of this line is given by the expression:

$$Z_n = Z_0 \left[ \frac{Z_t \cos \beta l j Z_0 \sin \beta l}{Z_0 \cos \beta l j Z_t \sin \beta l} \right]$$

If we make the length, $l$, of the line equal to one-half wavelength $$\left(\frac{\lambda}{2}\right)$$

then the line is said to be resonated at the frequency $$f = \frac{V}{\lambda}$$

Substituting $$\frac{\lambda}{2} \text{ for } l$$

then:

$$Z_n = Z_t = \text{termination impedance}$$

If, now, we make $$Z_t = \frac{-j}{\omega C}$$

then, at resonance, this capacitive termination is reflected back to the input and the cable itself has no effect.

Now, consider the case where the line is shorter or longer than $$\frac{\lambda}{2}$$

by the amount $d$. Then:

$$l = \frac{\lambda}{2} + d$$

or $$\beta l = \frac{2\pi}{\lambda}\left(\frac{\lambda}{2} + d\right) = \pi + \frac{2\pi d}{\lambda}$$

Since:

$$\cos\left(\pi + \frac{2\pi d}{\lambda}\right) = \cos \pi \cos \frac{2\pi d}{\lambda} - \sin \pi \sin \frac{2\pi d}{\lambda} = \frac{\cos \pi d}{\lambda}$$

and $$\sin\left(\pi + \frac{2\pi d}{\lambda}\right) = \sin \pi \cos \frac{2\pi d}{\lambda} + \cos \pi \frac{2\pi d}{\lambda} = \sin \frac{2\pi d}{\lambda}$$

we can write $Z_n$ as:

$$Z_n = Z_0 \frac{Z_t \cos \frac{2\pi d}{\lambda} + j Z_0 \sin \frac{2\pi d}{\lambda}}{Z_0 \cos \frac{2\pi d}{\lambda} + j Z_t \sin \frac{2\pi d}{\lambda}}$$

By dividing the numerator and denominator by $$\cos \frac{2\pi d}{\lambda}$$

we get:

$$Z_n \frac{Z_t + j Z_0 \tan \frac{2\pi d}{\lambda}}{1 + j\frac{Z_t}{Z_0} \tan \frac{2\pi d}{\lambda}}$$

If we now resonate the line by tuning the frequency until $Z_n$ is infinite, we have the condition wherein the denominator of the expression must be zero, or:

$$1 + j\frac{Z_t}{Z_0} \tan \frac{2\pi d}{\lambda} = 0$$

Solving for $d$, we get:

$$d = \frac{\lambda}{2\pi} \tan^{-1} \frac{jZ_0}{Z_t}$$

If the terminating impedance $Z_t$ is capacitive, $$Z_t = \frac{-j}{\omega C}$$

or:

$$d = \frac{\lambda}{2\pi} \tan^{-1} (Z_0 \omega C)$$

When additional capacitance $\Delta C$ is added across the line $Z_t$ must be replaced by $$\frac{j}{\omega(C+\Delta C)}$$

in which case:

$$Z_n = \frac{\frac{-j}{\omega(C+\Delta C)} + jZ_0 \tan\left[\frac{2\pi}{\lambda}\frac{\lambda}{2\pi}\tan^{-1}(-Z_0\omega C)\right]}{1+j\frac{Z_t}{Z_0}-jZ_0^2\omega C}$$

or:

$$\frac{1}{Z_n} = \frac{j\omega\Delta C}{1+Z_0^2\omega^2 C(C+\Delta C)}$$

Usually $Z_0^2\omega C(C+\Delta C) \ll 1$, so that:

$$\frac{1}{Z_n} = \omega\Delta C$$

Thus, any capacitive change from resonance will be reflected back to the input exactly as if the cable were not present which is ideal in the case of a moisture meter since it permits tuning out of initial capacity of the cell as well as any stray capacitance which may be present. If, in addition, the capacitance at the other end (input) of the cable can also be tuned out then a variable condenser across the cable input will solve the entire problem.

Consider the cable circuit with a condenser across the input circuit as shown in Figure 8. Let Z equal the impedance looking into the cable when shunted by a condenser $C_1$. Then:

$$Z = \frac{Z_1 Z_{1n}}{Z_1 + Z_{1n}}$$

where:

$$Z_{1n} = \frac{Z_t + jZ_0 \tan\frac{2\pi d}{\lambda}}{1+j\frac{Z_t}{Z_0}\tan\frac{2\pi d}{\lambda}}$$

and $$l = \frac{\lambda}{2} + d$$

If $Z_t = \frac{-j}{\omega C_2}$, and $Z_1 = \frac{-j}{\omega C_1}$, then:

$$Z = \frac{\left(\frac{-j}{\omega C_1}\right)\left[\frac{\frac{-j}{\omega C_2}+jZ_0\tan\frac{2\pi d}{\lambda}}{1+\frac{1}{Z_0\omega C_2}\tan\frac{2\pi d}{\lambda}}\right]}{\left(\frac{-j}{\omega C_1}\right)+\left[\frac{\frac{-j}{\omega C_2}+jZ_0\tan\frac{2\pi d}{\lambda}}{1+\frac{1}{Z_0\omega C_2}\tan\frac{2\pi d}{\lambda}}\right]}$$

$$= \frac{-\frac{1}{\omega C_1 C_2}+\frac{Z_0}{\omega C_1}\tan\frac{2\pi d}{\lambda}}{\frac{-j}{\omega C_1}-\frac{j}{\omega^2 C_1 C_2 Z_0}\tan\frac{2\pi d}{\lambda}-\frac{j}{\omega C_2}+jZ_0\tan\frac{2\pi d}{\lambda}}$$

If Z is made infinite, then the denominator must equal zero, or:

$$\frac{1}{\omega C_1}+\frac{1}{\omega C_2} = \left(Z_0 - \frac{1}{\omega^2 C_1 C_2 Z_0}\right)\tan\frac{2\pi d}{\lambda}$$

and $$d = \frac{\lambda}{2\pi}\tan^{-1}\left[\frac{Z_0\omega(C_1+C_2)}{1-\omega^2 C_1 C_2 Z_0}\right]$$

If $\omega^2 C_1 C_2 Z_0 \ll 1$, then:

$$d = \frac{\lambda}{2\pi}\tan^{-1}[-Z_0\omega(C_1+C_2)]$$

Since a line terminated in capacitance C calls for $$= \frac{\lambda}{2\pi}\tan^{-1}(-Z_0\omega C)$$

for resonance, it is obvious that C can be broken into $C_1 + C_2$ and $C_1$ placed at the cable input side without changing the conditions for resonance. Then, for the condition $\omega^2 C_1 C_2 Z_0^2 \ll 1$, and $$d = \frac{\lambda}{2\pi}\tan^{-1}[-Z_0(C_1+C_2)]$$

the value of Z is:

$$Z = j\omega\Delta C, \text{ where } Z_1 = \frac{-j}{\omega(C_2+\Delta C)}$$

Thus, we are able to completely tune out the initial cell capacitance and stray capacitance by placing a variable condenser across the input of a line cut short of $$\frac{\lambda}{2}$$

by $d$ feet. The specific length $d$ that is necessary is:

$$d = \frac{\lambda}{2}\tan^{-1}[-Z_0\omega(C_1+C_2)]$$

where $C_1+C_2$ equals the total initial capacitance across the line.

In the above discussion, it is to be noted that the velocity V, in the line, is not equal to that in free space but rather $$V = \frac{1}{\sqrt{\epsilon\mu}}$$

where:

$\epsilon$ = the dielectric constant in the line, and
$\mu = 1$

Also, in the above discussion it was assumed that the line has no loss. Actually, such an assumption is not valid practically and, consequently, it is necessary to stay a bit off resonance in order for the line to appear purely capacitive. This condition is easily achieved in the rectifier circuit by bucking out enough of the intial current to place the resonant point of the line below zero. This point must be chosen so that any change in capacitance across the line will cause a linear change at the input of the line and can best be established experimentally. Such zero suppression is necessary anyway since the diodes are quite non-linear unless they are conducting at least one milliampere.

A number of variations of the basic circuit, including the bucking out arrangement, are shown in Figures 9 and 10; and in each such circuit the meter current will be:

$$i = K(C_2 - C_1)$$

The radio frequency generator supplying energy to the diodes must supply a constant voltage of sinusoidal waveform and have a constant frequency and must maintain a constant output independent of the resistive and reactive load on the measuring network. These requirements can be met by a constant frequency, zero impedance generator of conventional design. I prefer to use a generator consisting of a power amplifier and a step-down transformer to provide the low impedance output as such a generator is useful at all frequencies.

Figure 14:
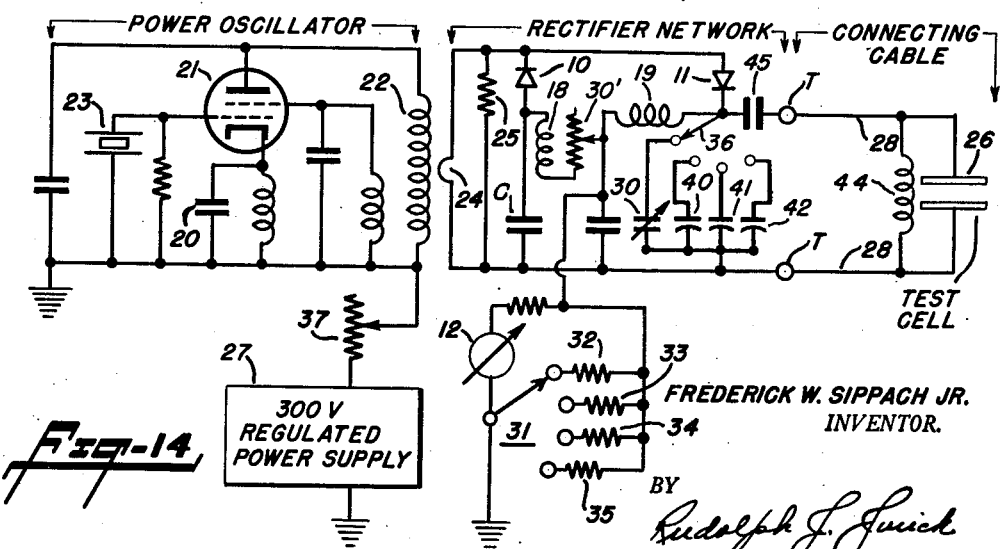
Figure 14 is a circuit diagram of a complete, continuous-reading moisture meter made in accordance with this invention.

A circuit diagram of the complete, continuous-reading, moisture meter is shown in Figure 14. The constant frequency source comprises an electron coupled, crystal controlled power oscillator which provides isolation between the frequency determining circuit and the output. Basically, this is a Colpitts oscillator wherein the grid to cathode capacitance together with condenser 20 between the screen grid and cathode provides the feedback voltage divider. The electron stream couples in the plate of the 6L6 tube 21 so that amplified energy can be drawn from the plate circuit. A tank coil 22 tuned to the oscillation frequency of the crystal 23 is disposed in the plate circuit and power is drawn off by means of a single turn loop 24 coupled to the coil 22 whereby the output impedance across the coupling loop is equal to the reflected plate circuit impedance. To reduce the output impedance a resistor 25 is connected across the loop 24. In such a case, power is drawn from the tank circuit and dissipated in the resistor and with a dissipation of 5 watts the output impedance is about 10-15 ohms which is sufficiently low at 7.2 megacycles to eliminate loading effects due to the high power factor of the material disposed between the plates of the condenser test cell 26. Since the oscillator is driven to the point where plate limiting occurs a regulated power supply 27 is used to energize the generator. Under this condition, the radio frequency output is proportional, and very nearly equal, to the plate supply voltage.

The tank circuit is adjusted by tuning the tank capacitor 20 for minimum plate current. The described oscillator is not critical with respect to the conductance of the electron tube or circuit values and will maintain constant output within 2 percent over about a 30 percent variation in tube conductance.

A coaxial line 28 is connected to the output terminals T of the rectifier network and one of the range suppression capacitors 30, 40, 41, 42 is connected into the circuit by means of the switch 36. The range of the indicating instrument 12 is determined by the capacitance of the particular capacitor selected by the setting of the switch 36 and the amount of instrument suppression so provided is, in all cases, limited to about 2 milliamperes which is sufficient to insure linearity of meter indications on all ranges. The zero position of the meter pointer is adjusted by means of the variable resistor 30' connected in series with the choke coil 18 and the sensitivity of the meter may be adjusted by selecting one of the resistance shunts 32—34 by means of the switch 31. The effective zero of the circuit is such that any increase in the capacitance across the network terminals T will result in an increase in the current flowing through the meter.

Provision is made for adjusting the output of the power oscillator for purposes of calibrating the direct current responsive meter 12. This is done by inserting a rheostat 37 in series with the B+ lead of the source 27. A B+ voltage variation of some 10% is sufficient to allow for diode and tube aging.

In calibrating the meter, a fixed condenser of known, predetermined capacity is connected to the end of the coaxial cable in place of the measuring cell 26 and the B voltage is adjusted to obtain a full scale meter deflection. This standardizes the meter sensitivity. The measuring cell is then connected to the cable in place of the known condenser and the circuit is balanced by adjustment of the appropriate capacitor 30, 40—42. After this is done the instrument is completely calibrated and ready for use. The placing of the material under test into the measuring cell 26 results in a displacement of the meter pointer to an extent linearly related to the moisture content of the material. Such pointer deflection is read with respect to a scale calibrated directly in terms of moisture content.

If the capacitance of the test cell and of the range suppression capacitors 30, 40—42 is large the current flowing in the diodes may be too high resulting in overloading with consequent non-linearity. In such case, an inductance 44 is connected across the test cell, the value of this inductance being so chosen that the resultant reactive current flowing in the measuring network (consisting of the test cell and the suppression capacitors) is relatively low, say 5 milliamperes. The inductance 44 cancels out the equivalent of 50-60 micromicrofarads of lumped capacitance and, therefore, the balancing capacitor C can be less than 10 mmf. When the inductance 44 is used a blocking capacitor 45 is inserted into the circuit to prevent the inductance from shorting the test cell and to limit the diode current if the test cell is accidentally short circuited.

Having now described my invention, those skilled in this art will appreciate the following advantages thereof.

1. The apparatus provides a direct, continuous linear capacitance reading;
2. The circuit permits of a common ground point between the generator, meter and capacitor being measured;
3. The circuit includes a stable, zero capacitance setting independent of generator voltage, generator frequency, and temperature;
4. Provision is made for conveniently balancing out stray capacitance at the measuring network terminals;
5. The system includes provision for isolating the measuring part of the apparatus from the rest of the apparatus with a long cable and in such a way that capacitance variations of the cable do not affect the meter readings;
6. The system is capable of measuring capacitors having a high power factor.
7. The meter can be calibrated by just one reference point;
8. The system is capable of measuring any range of capacitance by proper choice of operating frequency;
9. The meter has a high sensitivity approximately equal to 1 milliampere/mmf. at 15 megacycles; and
10. For moisture measurements, the adaptability of the system to high frequency permits over-coming loading effects, interfacial effects, biological effects, etc.

While the above description has been specifically directed to a moisture meter, it will be apparent the invention is of broader scope. It is adapted to the measurement of film and paint thicknesses, strain gauges, etc. and in fact to any application wherein a variable factor or condition can be related to capacitance changes.

While I have shown and described particular embodiments of my invention, it will be understood that I do not wish to be limited thereto since it is quite apparent the principles disclosed herein are susceptible of numerous other applications; and modifications may be made in the circuit arrangements and in the instrumentalities employed without departing from the spirit and scope of my invention as set forth in the following claims.

I claim:

1. Apparatus directly responsive to changes in the capacitance of a test member comprising a low impedance alternating current source of constant voltage; a first alternating current path consisting of a series connected rectifier and a variable capacitor connected to the voltage source through a blocking capacitor having a substantially zero alternating current reactance; a second alternating current path connected to the voltage source through the blocking condenser, said second path consisting of a rectifier connected in series with the test member; a pair of impedances connected in series and across the junction point of the rectifier and capacitor forming the said first current path and the junction point of the rectifier and test member forming the said second current path; and a device responsive to direct current, said device having one terminal connected to the common point of said pair of impedances and the other terminal connected to the said blocking capacitor through a choke coil having a low resistance and a high alternating current reactance.

2. The invention as recited in claim 1, wherein said rectifiers are disposed in opposed sense and the said device comprises a direct current indicating instrument having a pointer movable over a scale calibrated in terms of capacitance.

3. The invention as recited in claim 2, wherein the said pair of impedances comprise choke coils having a high alternating current reactance.

4. The invention as recited in claim 2, wherein one of said pair of impedances comprises a resistor and the other impedance comprises a choke coil having a high alternating current reactance.

5. The invention as recited in claim 2, wherein the said one terminal of the instrument is also grounded.

6. The invention as recited in claim 2, wherein the said other terminal of the instrument is grounded.

7. Apparatus directly responsive to changes in the capacitance of a test member comprising a low impedance alternating current source of constant voltage; a first alternating current path consisting of a first rectifier and a variable capacitor connected in series and to the voltage source through a blocking capacitor having a substantially zero alternating current reactance; a second alternating current path consisting of a second rectifier connected in series with the test member, said second current path being parallel to the first current path but isolated therefrom by a pair of isolating capacitors; a choke coil connected across the said variable capacitor; a choke coil connected across the test member; and a direct current indicating instrument, one instrument terminal being connected to the said first choke coil and the other instrument terminal being connected to the other said choke coil and to the said blocking capacitor through a third choke coil having a low ohmic resistance and a high alternating current reactance.

8. Apparatus directly responsive to changes in the capacitance of a test member comprising a low impedance alternating current source of constant voltage; a first rectifier and a variable capacitor connected in series and across the voltage source through a blocking capacitor having a substantially zero alternating current reactance; a first choke coil connected across the said first rectifier and variable capacitor; a second choke coil connected in parallel with the said first choke coil through a pair of isolating capacitors; a second rectifier connected in series with the test member, said second rectifier and test member being shunted by the said second choke coil; a direct current indicating instrument; a third choke coil connected between the common junction of the said first rectifier and variable capacitor and one terminal of the instrument; a lead connecting the said one terminal of the instrument to one side of the test member; a fourth choke coil connected between the junction of the said second rectifier and test member and the other terminal of the instrument; and a lead connecting said other terminal of the instrument to the voltage source.

9. Apparatus directly responsive to changes in the capacitance of a test member located at a point removed from the apparatus and comprising a low impedance alternating current source of constant voltage; a first alternating current path connected to the voltage source through a blocking capacitor having a substantially zero alternating current reactance, said path consisting of a first rectifier connected in series with a variable capacitor; a second alternating current path connected to the voltage source through the blocking capacitor, said path consisting of a second rectifier connected in series with the test member through a cable; a pair of impedances connected in series and between the junction point of said first rectifier and variable capacitor and the junction point of the second rectifier and test member; a direct current indicating instrument having one terminal connected to the common point of said impedances and the other terminal connected to the said blocking capacitor through a choke coil having a low ohmic resistance and a substantially infinite alternating current reactance; and means resonating the said cable at the frequency of the voltage source.

10. The invention as recited in claim 9, wherein the physical length of the cable is less than an integral multiple of one-half wave length of the frequency of the voltage source; and the means tuning the cable to resonance is a capacitor connected across an end of the cable.

11. Apparatus directly and linearly responsive to changes in the capacitance of a test member comprising a grounded electronic oscillator having a tank coil; a coupling coil coupled to the tank coil; a first alternating current path connected across the coupling coil, said path comprising a first rectifier connected in series with a capacitor; a second alternating current path connected across the coupling coil, said path comprising a second rectifier connected to the test member; a pair of impedances connected in series and between the junction point of the rectifier and capacitor forming the first current path and the junction point of the rectifier and test member forming the said second current path; and a direct current instrument having a pointer movable over a scale calibrated in terms of capacitance, one terminal of the instrument being connected to the common point of said impedances and the other terminal of the instrument being connected to ground.

12. The invention as recited in claim 11, wherein the said two impedances are choke coils.

13. The invention as recited in claim 12, wherein the test member is remotely disposed relative to the apparatus and connected thereto by a cable, and including means resonating the cable at the oscillator frequency.

14. The invention as recited in claim 11, wherein one of said impedances is a choke coil and the other is a resistor.

15. The invention as recited in claim 14, wherein the test member is remotely disposed relative to the apparatus and connected thereto by a cable, and including means resonating the cable at the oscillator frequency.

16. Apparatus directly and linearly responsive to changes in the capacitance of a remotely positioned test member and comprising a grounded electronic oscillator having a tank coil; a coupling coil coupled to the tank coil; a first alternating current path connected across the coupling coil, said path comprising a first rectifier connected in series with a capacitor; a second alternating current path connected across the coupling coil, said path comprising a second rectifier connected in series with the test member by a cable having a length shorter than an integral multiple of one-half wave length of the oscillator; a capacitor connected across the cable and tuned to resonate the cable at the oscillator frequency; a pair of impedances connected in series between the junction point of the first rectifier and capacitor forming the said first current path and the junction point of the rectifier and test member forming the said second current path; and a direct current instrument having a pointer movable over a scale calibrated in terms of capacitance, one terminal of the instrument being connected to the common point of said impedances and the other terminal of the instrument being connected to ground.

References Cited in the file of this patent

UNITED STATES PATENTS

| | | |
|---|---|---|
| 2,265,833 | Fritz | Dec. 9, 1941 |
| 2,475,198 | Reinschmidt | July 5, 1949 |